US008682575B2

(12) United States Patent
Sakashita

(10) Patent No.: US 8,682,575 B2
(45) Date of Patent: Mar. 25, 2014

(54) OFF ROAD NAVIGATION SYSTEM

(75) Inventor: Naohiro Sakashita, Oobu (JP)

(73) Assignees: DENSO International America, Inc., Southfield, MI (US); Denso Corporation, Kariya-shi, Aichi-ken (JP)

( * ) Notice: Subject to any disclaimer, the term of this patent is extended or adjusted under 35 U.S.C. 154(b) by 942 days.

(21) Appl. No.: 12/491,577

(22) Filed: Jun. 25, 2009

(65) Prior Publication Data

US 2010/0332116 A1 Dec. 30, 2010

(51) Int. Cl.
*G01C 21/00* (2006.01)

(52) U.S. Cl.
USPC ........... 701/424; 701/413; 701/428; 701/442; 701/466; 701/467; 340/995.27

(58) Field of Classification Search
USPC ......... 701/410, 413, 417, 424, 428, 429, 431, 701/439, 442, 454, 466, 467; 340/995.1, 340/995.14, 995.15, 995.27
See application file for complete search history.

(56) References Cited

U.S. PATENT DOCUMENTS

| | | | |
|---|---|---|---|
| 5,955,973 A * | 9/1999 | Anderson | 340/988 |
| 6,085,135 A * | 7/2000 | Steckel | 701/50 |
| 6,321,158 B1 * | 11/2001 | DeLorme et al. | 701/426 |
| 6,356,837 B1 * | 3/2002 | Yokota et al. | 701/411 |
| 6,418,373 B1 | 7/2002 | Omi et al. | |
| 6,487,496 B2 * | 11/2002 | Katayama et al. | 701/417 |
| 6,836,725 B2 * | 12/2004 | Millington et al. | 701/454 |
| 6,847,891 B2 * | 1/2005 | Pietras et al. | 701/408 |
| 7,003,397 B2 * | 2/2006 | Yokota et al. | 701/454 |
| 7,209,829 B2 * | 4/2007 | Litvack et al. | 701/533 |
| 7,756,635 B2 * | 7/2010 | Milbert | 701/416 |
| 7,831,384 B2 * | 11/2010 | Bill | 701/423 |
| 7,856,315 B2 * | 12/2010 | Sheha et al. | 701/412 |

(Continued)

FOREIGN PATENT DOCUMENTS

| | | | | |
|---|---|---|---|---|
| EP | 1477770 A1 * | 11/2004 | | G01C 21/36 |
| JP | 2002-357431 | 12/2002 | | |

OTHER PUBLICATIONS

Office Action dated Apr. 25, 2012 mailed in the corresponding Chinese patent application No. 2010 1021 4261.5 with English translation thereof.

(Continued)

*Primary Examiner* — Thomas Black
*Assistant Examiner* — Peter D Nolan
(74) *Attorney, Agent, or Firm* — Harness, Dickey & Pierce, P.L.C.

(57) ABSTRACT

A method of operating a navigation system in a vehicle may entail invoking an off-road mode of the navigation system; displaying a first off-road terrain on a navigation system display; displaying a first present location of the vehicle on the display, inputting a first user-input off-road destination into the navigation system; inputting a first user-input off-road waypoint into the navigation system; displaying straight line trajectories between the start point, the first user-input off-road waypoint and the destination on a display of the navigation system and displaying a first real-time path of on-screen breadcrumbs as the vehicle travels off-road in current or real-time; shifting on the display, each user-entered off-road waypoint to a closest on-screen breadcrumb of the first real-time path; shifting on the display, the user-entered destination to the closest on-screen breadcrumb; and storing the first real-time path in a memory of a navigation control unit.

14 Claims, 7 Drawing Sheets

(56) References Cited

U.S. PATENT DOCUMENTS

| | | | |
|---|---|---|---|
| 7,889,065 B2* | 2/2011 | Smith | 340/465 |
| 8,027,785 B2* | 9/2011 | Adams | 701/428 |
| 2002/0111736 A1* | 8/2002 | Chowanic et al. | 701/209 |
| 2003/0060971 A1 | 3/2003 | Millington et al. | |
| 2004/0220730 A1* | 11/2004 | Chen et al. | 701/210 |
| 2005/0038595 A1 | 2/2005 | Yokota et al. | |
| 2010/0063731 A1* | 3/2010 | Milbert et al. | 701/211 |

OTHER PUBLICATIONS

Office action dated Mar. 5, 2013 in corresponding Chinese Application No. 2010 10214261.5.

* cited by examiner

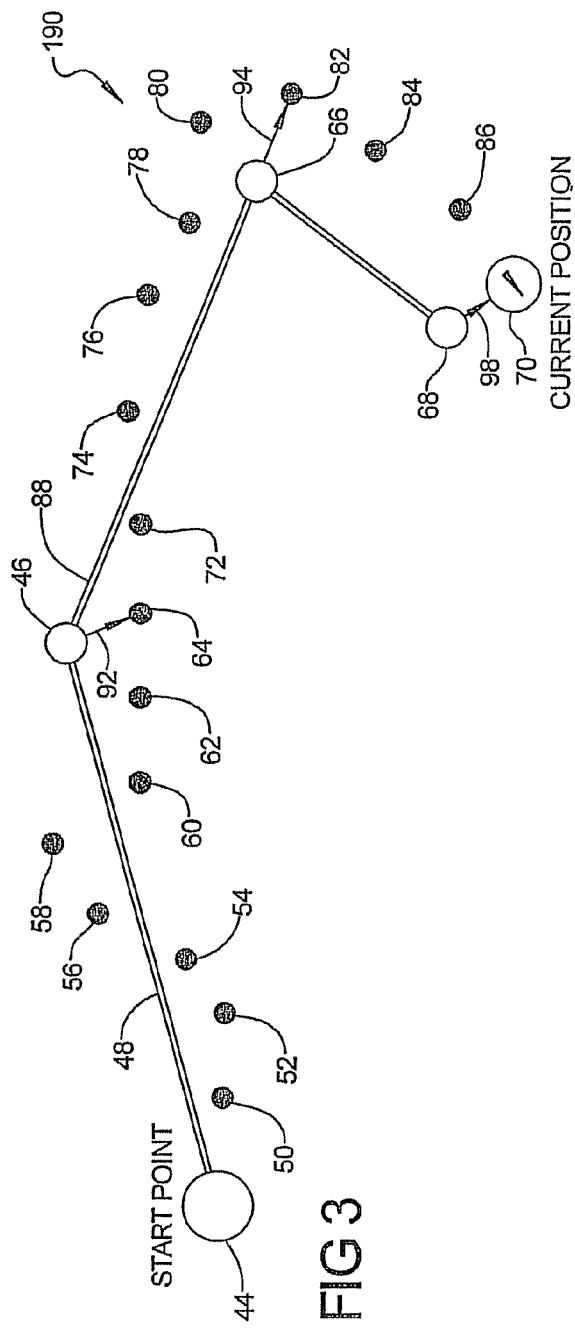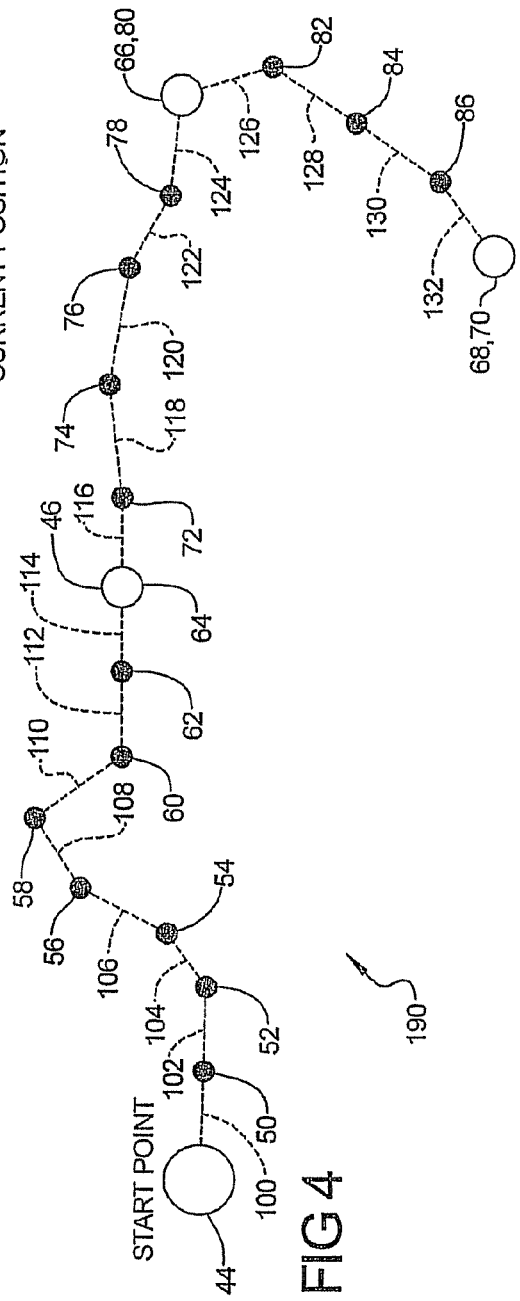

OFF ROAD NAVIGATION SYSTEM

FIELD

The present disclosure relates to a method of computing and displaying off-road routes on a navigation system for a vehicle that is off-road.

BACKGROUND

This section provides background information related to the present disclosure which is not necessarily prior art. Some modern navigation systems have an off-road mode that may display a route to a chosen destination; however, such navigation systems are not without their share of limitations.

As an example, FIG. 1 is a prior art plan view of an off-road navigation path 2 demarking a current vehicle position 4, path waypoints 6, 8, 10, 12 and recommended trajectories 14, 16, 18, 20, 22 or routes for vehicle travel. More specifically, trajectory 14 is a recommended path of travel from an original or current vehicle location 4 to the first waypoint 6, trajectory 16 is a recommended path of travel between first waypoint 6 and second waypoint 8, trajectory 18 is a recommended path of travel between second waypoint 8 and third waypoint 10, trajectory 20 is a recommended path of travel between third waypoint 10 and fourth waypoint 12, and trajectory 22 is a recommended path of travel between fourth waypoint 12 and destination 24. While such off-road navigation paths displayed by navigation systems in an off-road mode have been satisfactory, they are not without limitations.

One limitation of current off-road modes of navigation systems is that such waypoints 6, 8, 10, 12 and destination 24 become displayed set points only after a user selects such points from a navigation system screen that displays a map of a desired off-road area. Because roads are non-existent in an off-road area, a user must self-select waypoints. Straight line trajectories 14, 16, 18, 20, 22 are displayed on the display upon selecting waypoints as described above, but are merely reference trajectories because such trajectories, and intermediate waypoints and the destination, are along an off-road path whose actual terrain is unknown and potentially inappropriate or impossible for vehicle travel. For instance, any of the above noted trajectories may be through a river that is deeper than an off-road vehicle is capable of traveling, or the ground clearance of the terrain may be more than an off-road vehicle is capable of accommodating. While the waypoints and straight-line trajectories may be stored and re-used, such a route may be incorrect or wrong due to such inhospitable terrain noted above. If a vehicle driver desires to correct the positions of waypoints and the destination along an off-road path, he or she must manually set memory points as new waypoints and a new destination as he or she traverses the off-road terrain and then store such set points in navigation system memory as a new route. Thus, current system trajectory selection may not be accurate or appropriate for a vehicle.

Another limitation of current off-road navigation modes of vehicle navigation systems is that voice guidance may also be inaccurate and difficult to follow. As an example, when a vehicle approaches waypoint 6 on FIG. 1, the vehicle may be deemed to actually reach waypoint 6 when the vehicle travels within an area 26 around waypoint 6. When the vehicle enters area 26, a voice guidance system may then instruct the vehicle driver, for example, "to turn 45 degrees to the right" in order to proceed to the next waypoint, such as waypoint 8; however, depending upon where in area 26 the voice guidance instructs the driver to turn, the driver may begin along a path such as trajectory 30, which is not along originally prescribed path 16 and not in line to intersect with waypoint 8. If a vehicle driver were to follow such voice directions, arriving within area 28 around destination 24 may be difficult or impossible to achieve.

What is needed then is an off-road navigation system that does not suffer from the above limitations.

SUMMARY

This section provides a general summary of the disclosure, and is not a comprehensive disclosure of its full scope or all of its features. A method of operating a navigation system in a vehicle may entail invoking an off-road mode of the navigation system; displaying a first off-road terrain on a navigation system display; displaying a first present location of the vehicle on the display, inputting a first user-input off-road destination into the navigation system; inputting a first user-input off-road waypoint into the navigation system; displaying straight line trajectories between the start point, the first user-input off-road waypoint and the destination on a display of the navigation system and displaying a first real-time path of on-screen breadcrumbs as the vehicle travels off-road in current or real-time; shifting on the display, each user-entered off-road waypoint to a closest on-screen breadcrumb of the first real-time path; shifting on the display, the user-entered destination to the closest on-screen breadcrumb; and storing the first real-time path in a memory of a navigation control unit.

Moreover, a method of operating a navigation system in a vehicle may further entail calculating a first distance between the current, real-time vehicle position and the waypoint; comparing the first distance between the current vehicle position and the waypoint to a first predetermined distance; shifting, on the display, the first user-input off-road waypoint to an on-screen breadcrumb of the first real-time path when the on-screen breadcrumb of the first real-time path is within a predetermined distance of the first user-input off-road waypoint; and displaying a new waypoint on the screen on the first real-time path when a vehicle engine is shut off. Still yet, the method may involve comparing the first real-time path of on-screen breadcrumbs to a first stored off-road path of breadcrumbs having a same first user-input off-road destination; and comparing the first real-time path of on-screen breadcrumbs to a second stored off-road path of breadcrumbs having the same first user-input off-road destination. If a stored off-road path has the same destination and breadcrumb positions of the real-time path and the stored path match, the stored path may appear on the display as a travel option for the driver. If more than one stored path exists, then the path whose breadcrumbs most closely match that of the real time path may appear on the display as a known and safe off-road navigation path.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a plan view of a route for which waypoints and destination are placed onto a vehicle trajectory of breadcrumbs;

FIG. 4 is a plan view of the waypoints and destination of FIG. 3 integrated into the route of breadcrumbs of FIG. 3;

Corresponding reference numerals indicate corresponding parts throughout the several views of the drawings.

DETAILED DESCRIPTION

Figure 2:
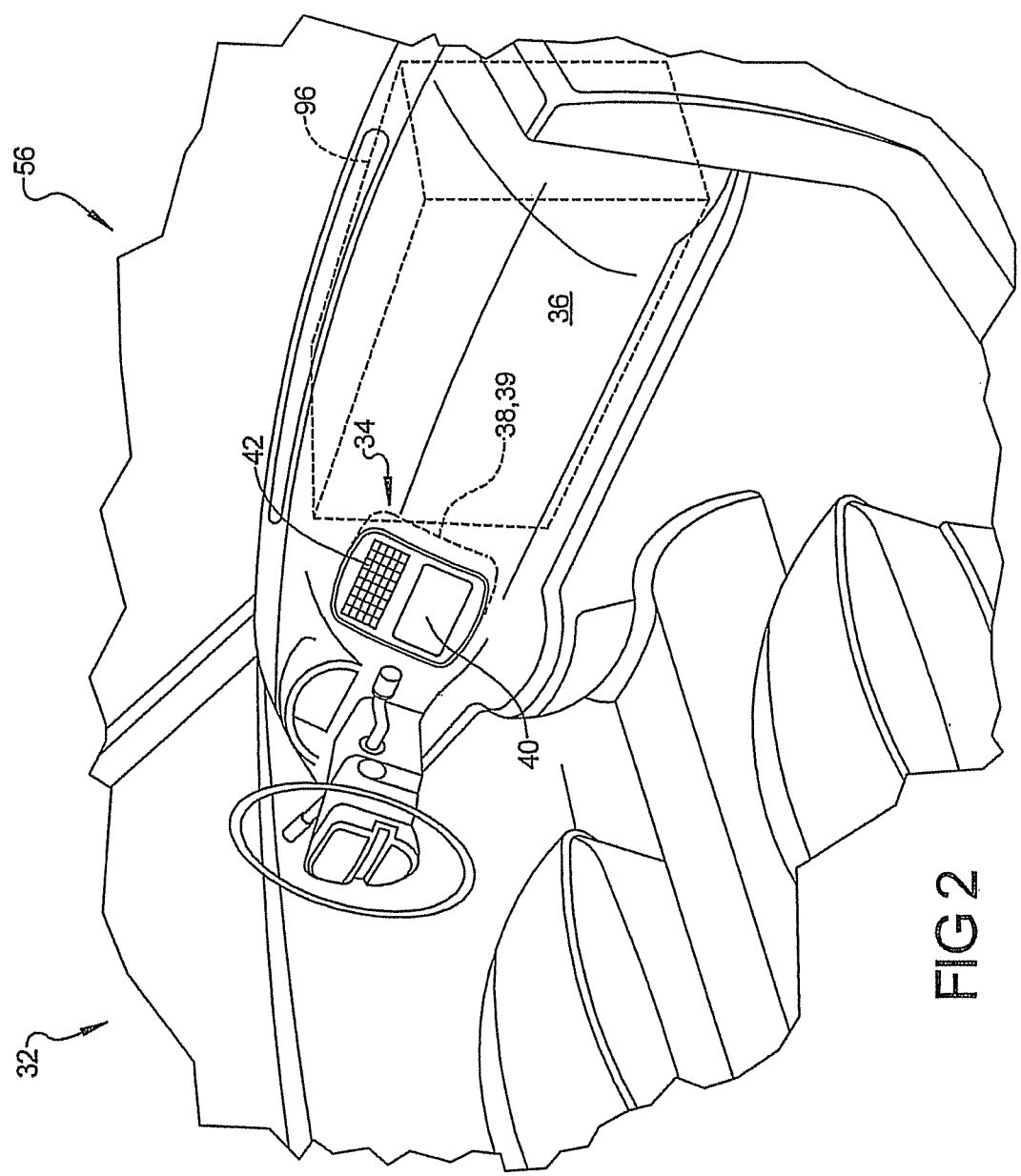
FIG. 2 is a perspective view of part of a vehicle and a vehicle interior depicting a location of a navigation system.

Example embodiments will now be described more fully with reference to FIGS. 2-8 of the accompanying drawings. FIG. 2 depicts a vehicle 32 that employs a navigation system 34, which may be mounted in the dash 36 of the vehicle interior. The navigation system 34 may employ a navigation control unit 38 that computes route data, such as a route that a vehicle is traveling or is recommended to travel, and displays such route data on a display 40. The navigation control unit 38 may determine the position of the vehicle 32 relative to the destination address and provide visual driving directions on the display 40 and audible driving directions to explain to the driver how to navigate to the destination address. The navigation control unit 38 may also include memory 39 with a memory feature that permits the driver of the vehicle to store frequently used destination addresses, such as a home address, business address, or a work address. These stored addresses may be temporarily viewable on the display 40 when accessing or using the memory feature. Memory features and programming features of the navigation system may be accessed using one or more buttons 42 on the dash, such as around the display 40. Moreover, the display 40 itself may be a touch screen display such that programming and memory features may be accessed or invoked by touching areas of the display 40.

With reference now including FIG. 3, in an off-road mode of a vehicle navigation system in accordance with the present disclosure, a multitude of "breadcrumbs" may be "dropped" while a vehicle travels toward waypoints. Advanced global positioning system ("GPS") tools may keep track of the motion of a GPS device bearer by recording the positions of the traveler at specified time moments or at specified or consist distances from a previous breadcrumb and presenting them at a GPS display as a "breadcrumb trail" of position markers. On a navigation system display screen, breadcrumbs may appear as a trail of lighted dots or pixels. More specifically, if a vehicle starts at start point 44 and begins traveling toward user-selected waypoint 46, although the navigation system will insert a straight trajectory 48 between start point 44 and waypoint 46, the driver does not steer the vehicle along trajectory 48, but instead along a trajectory noted with breadcrumbs 50, 52, 54, 56, 58, 60, 62, 64, which will place the vehicle close to waypoint 46. As the vehicle moves away from waypoint 46 and begins moving toward waypoint 66, and then destination 68 with the vehicle stopping at position 70, near destination 68, additional breadcrumbs 72, 74, 76, 78, 80, 82, 84, 86 are displayed on navigation display 40. As depicted in FIG. 3, the vehicle may traverse a route or path different from the straight line trajectories 48, 88, 90 that are projected from the starting point 44 through waypoints 46, 66 and to destination 68. Thus, in accordance with the present teachings, breadcrumbs as described above in conjunction with FIG. 3, will appear on navigation display 40 to mark the path or trajectory that the vehicle actually traversed en route to waypoints 46, 66 and destination 68. The path noted by breadcrumbs may or may not be different from the suggested straight-line trajectories 48, 88, 90 that merely connect the starting point with the destination with one or more waypoints in between; however, due to differences and unpredictability of the terrain along the straight line trajectories, travel along a path other than the straight-line trajectories is likely.

Figure 1:
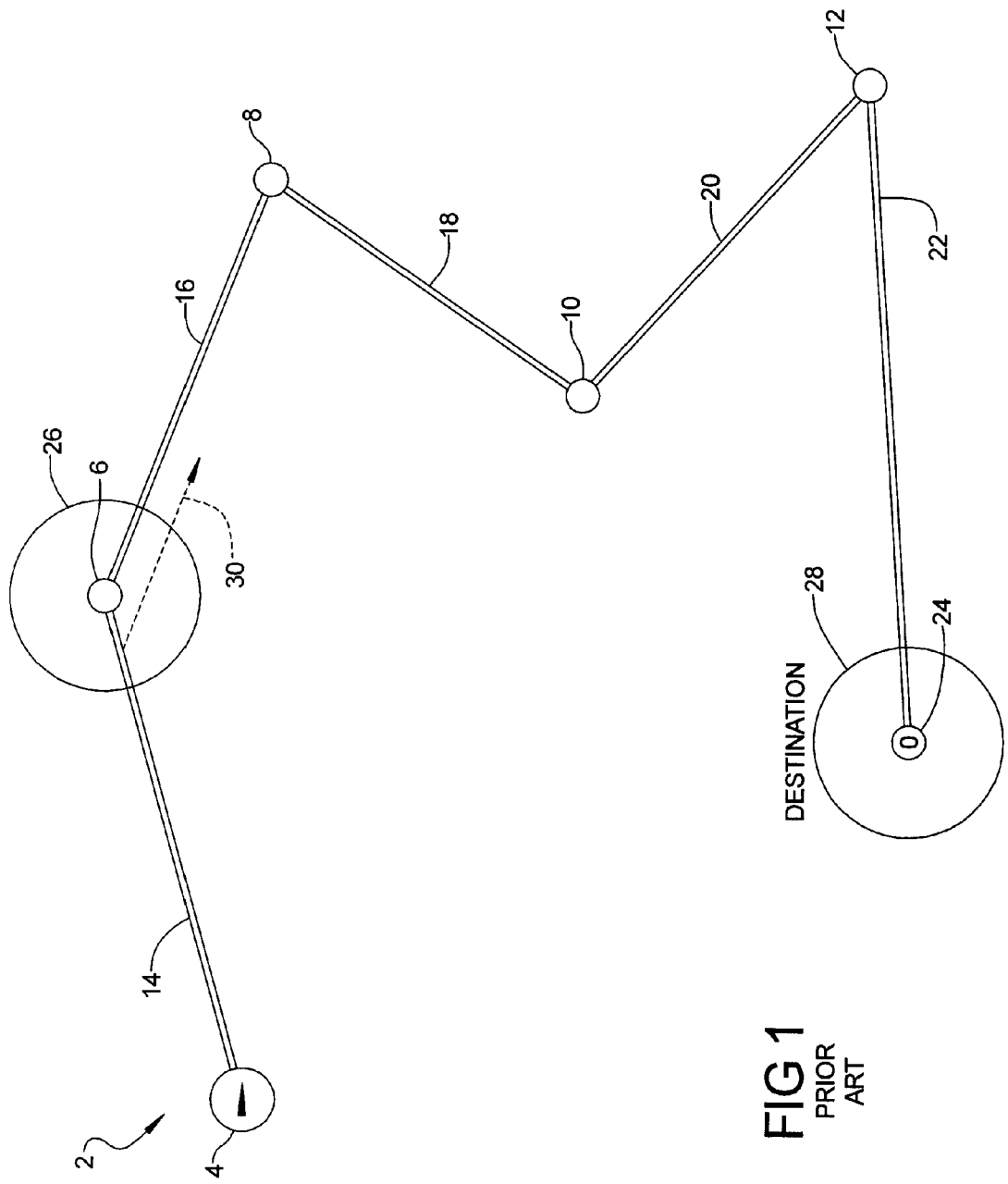
FIG. 1 is a plan view of a route displayed by a navigation system in accordance with the prior art.

Continuing with reference to FIG. 3, and with additional reference to FIG. 4, the navigation control unit 38 will recognize, for instance, which breadcrumb 64 is closest to waypoint 46 and then merge the locations. More specifically, the navigation control unit 38 will cause the display 40 to depict waypoint 46 where breadcrumb 64 is located. Thus, although waypoint 46 was originally selected by a vehicle driver as a waypoint or physical location to traverse, but such waypoint was not physically reached or driven over by the vehicle, the navigation control unit 38 will place or move waypoint 46 to the closest breadcrumb, which in the example of FIGS. 3 and 4, is breadcrumb 64, which was actually traversed or driven over by the vehicle. Such movement or relocation of selected waypoint 46 to breadcrumb 64 is indicated by arrow 92 in FIG. 3. Similarly, as displayed by display 40 and depicted in FIG. 3, waypoint 66 is also a waypoint that was not actually traversed (i.e. driven over or through), and that lies closest to breadcrumb 80. Therefore, navigation control unit 38 will display a waypoint 66 at the same location as breadcrumb 80, as depicted in FIG. 3 with arrow 94. Although the above-described movements are of waypoints to breadcrumb locations, the same is true for desired destinations. More specifically, as depicted in FIGS. 3 and 4, desired vehicle destination 68 may automatically be moved to current vehicle position 70 when the vehicle has finished traveling or moving, such as when the engine is turned off. Thus, a waypoint or destination may be shifted on the display 40 to the actual physical location of the vehicle (on the display 40) when the vehicle engine 96 (FIG. 1) is turned off, as is indicated in FIG. 3 with arrow 98. FIG. 4 depicts dashed routes 100, 102, 104 106, 108, 110, 112, 114, 116, 118, 120, 122, 124, 126, 128, 130, 132 which represent the actual off-road route traveled by the vehicle from start point 44, through corrected waypoints 46, 66 and to corrected destination 70. The dashed routes 100-132 and waypoints 50-70 may be stored into memory of navigation control unit 38 and utilized in the future. An advantage of this feature is that the breadcrumbs or trajectory of any actual or real-time driving is more accurate, and actual driving is relatively close, in distance, to the waypoints and destination. Therefore, the originally entered waypoints and destination are shifted and then stored to those of the real-time route.

Figure 5:
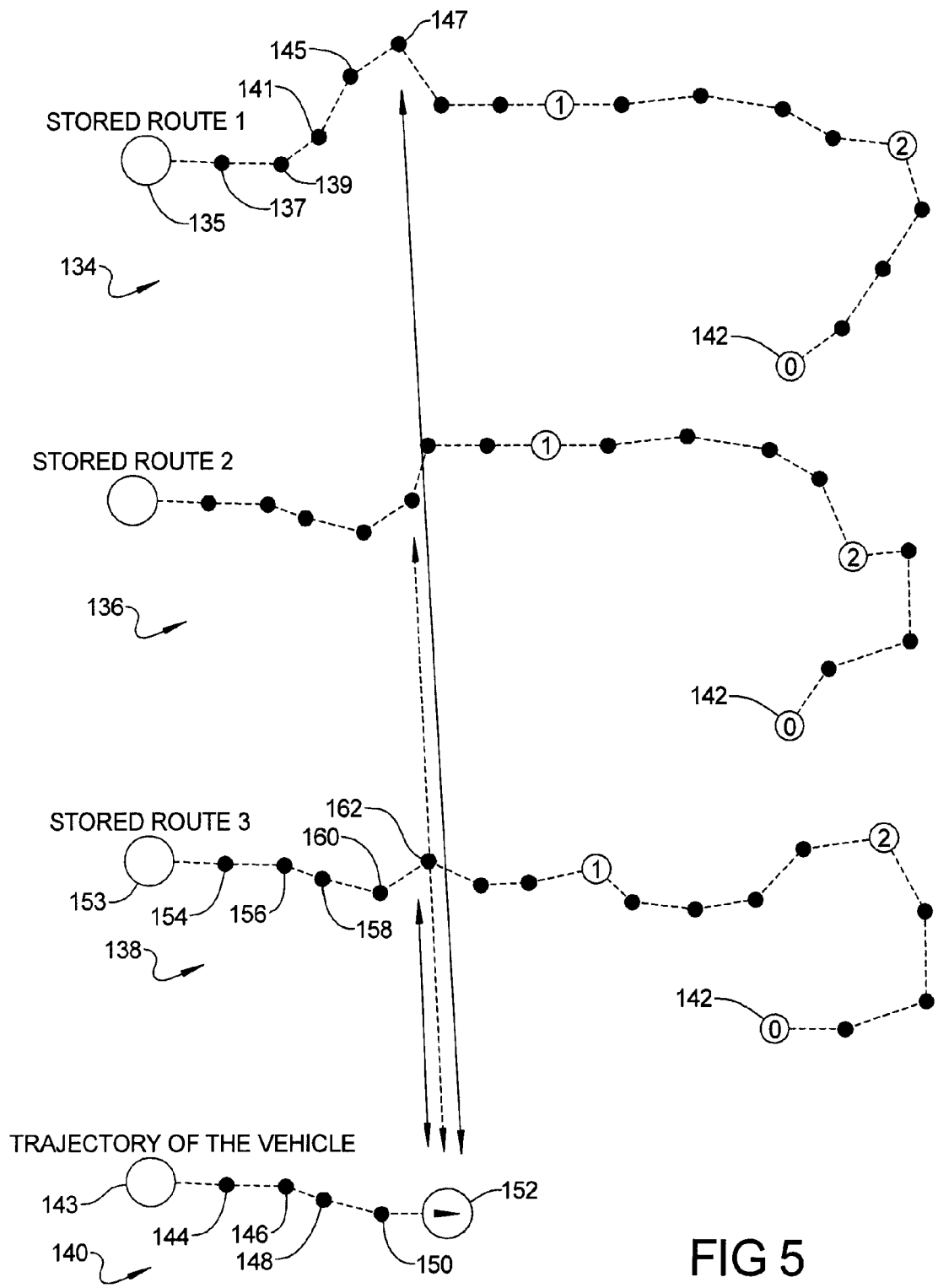
FIG. 5 is a plan view of stored routes and a trajectory of a vehicle that is matched with one of the stored routes.

Turning now to FIG. 5, a multitude of off-road routes 134, 136, 138 may be stored in the memory of navigation control unit 38, each route reflecting a separate and different trajectory of a vehicle that has traveled off-road. In one example, the off-road routes 134, 136, 138 each may be just a slight variation of a route to the same destination. The stored routes 134, 136, 138 may be slightly different because of when the route was traversed. For instance, route 134 may have been driven during late summer when streams were at a low level, thus route 134 may cross a stream just six inches (about 15.24 centimeters) deep, while route 136 may have been driven in the spring of the year during spring rains or just after winter now has melted, thus making the same stream, which was crossed in route 134, impossible to cross with an off-road vehicle. Similarly, route 138 may be yet another route that is preferred for its easy to traverse terrain or spectacular views. Regardless, such routes 134, 136, 138 may be stored in the memory of navigation control unit 38. The navigation control unit 38 may be programmed to store a predetermined quantity of routes to the same destination while eliminating the oldest route each time a newer route (e.g. traveled later in time) to the same destination is attempted to be stored in excess of the predetermined number of destinations. In this manner, memory usage may be controlled.

As an example, an advantage of storing routes 134, 136, 138 depicted in FIG. 5 is that when a vehicle driver again decides to travel to the same destination, such as destination 142, and then begins driving to destination 142, the navigation control unit 38 will perform a quick comparison between the real-time route being driven, which is concurrently being displayed on the display 40, and the routes 134, 136, 138 stored in memory. The route stored in memory that matches or most closely matches the real-time route being driven may then be displayed on the display 40. More specifically, as depicted in FIG. 5, route 140 with waypoints 144, 146, 148, 150 and current vehicle location 152 most closely matches that of stored route 138 with waypoints 154, 156, 158, 160, 162. Thus, stored route 138 may be displayed on the display 40 as a suggested route for the vehicle driver to traverse. An advantage of having a stored route appear on display 40 as a driver drives an off-road route is that the surface conditions of off-road routes typically change depending upon the time of year. For example, during spring, rivers and streams may run deeper than in autumn, and in winter, snow covered steep grades may be more treacherous than the same grade during summer. Thus, as a driver negotiates an off-road route, the route that matches or closely matches the route being driven by the driver will automatically appear on display 40 from memory of navigation control unit 38. Ultimately, the effect of such a feature is that if the navigation control unit 38 memorizes some actual routes traversed by a vehicle, such as routes 134, 136, 138, the most appropriate route, which is the route that matches the real-time driving route 140, may be utilized for the balance of the current real-time driving route 140.

Figure 6:
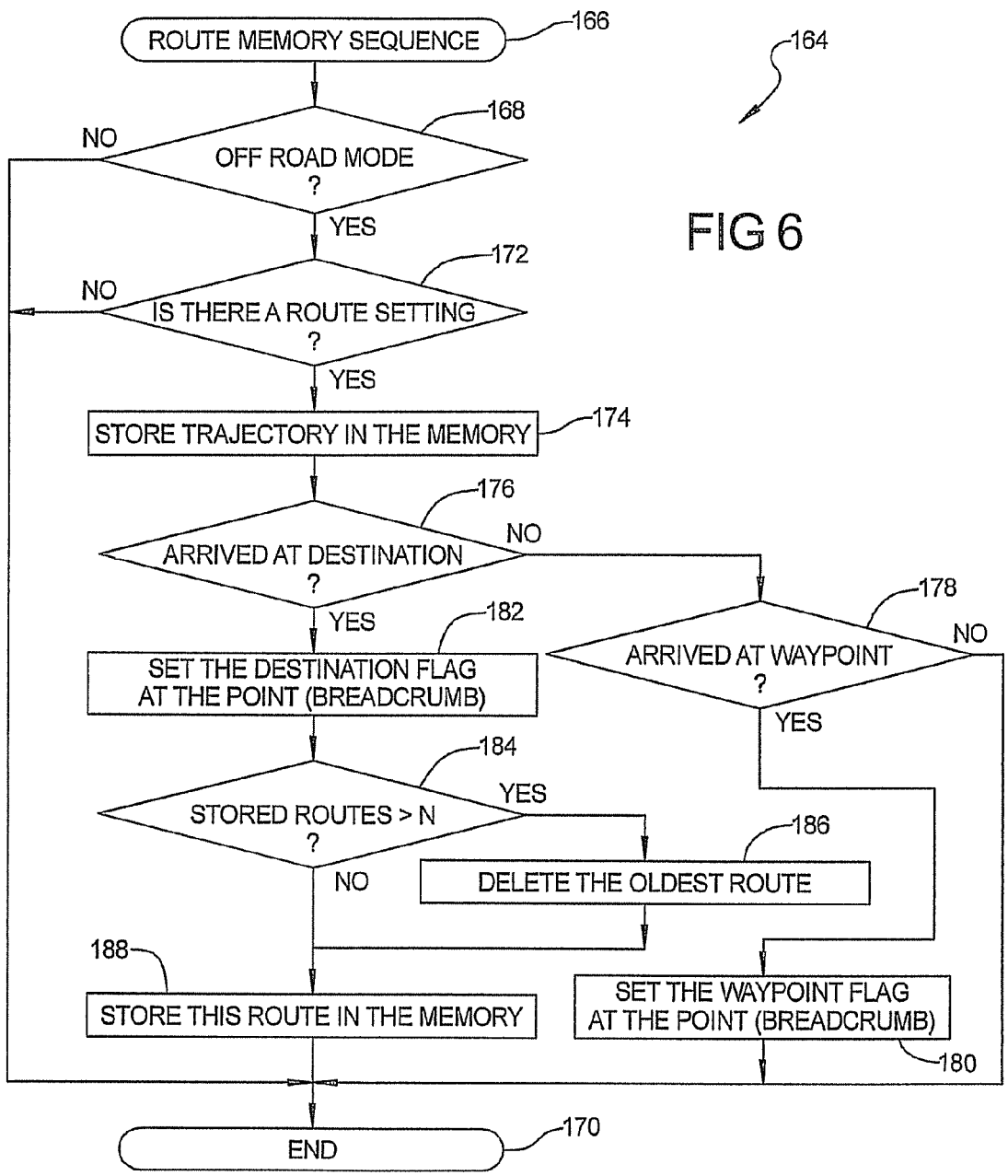
FIG. 6 is a flowchart depicting a method of operation of a navigation system in accordance with the teachings of the present invention.
Figure 7:
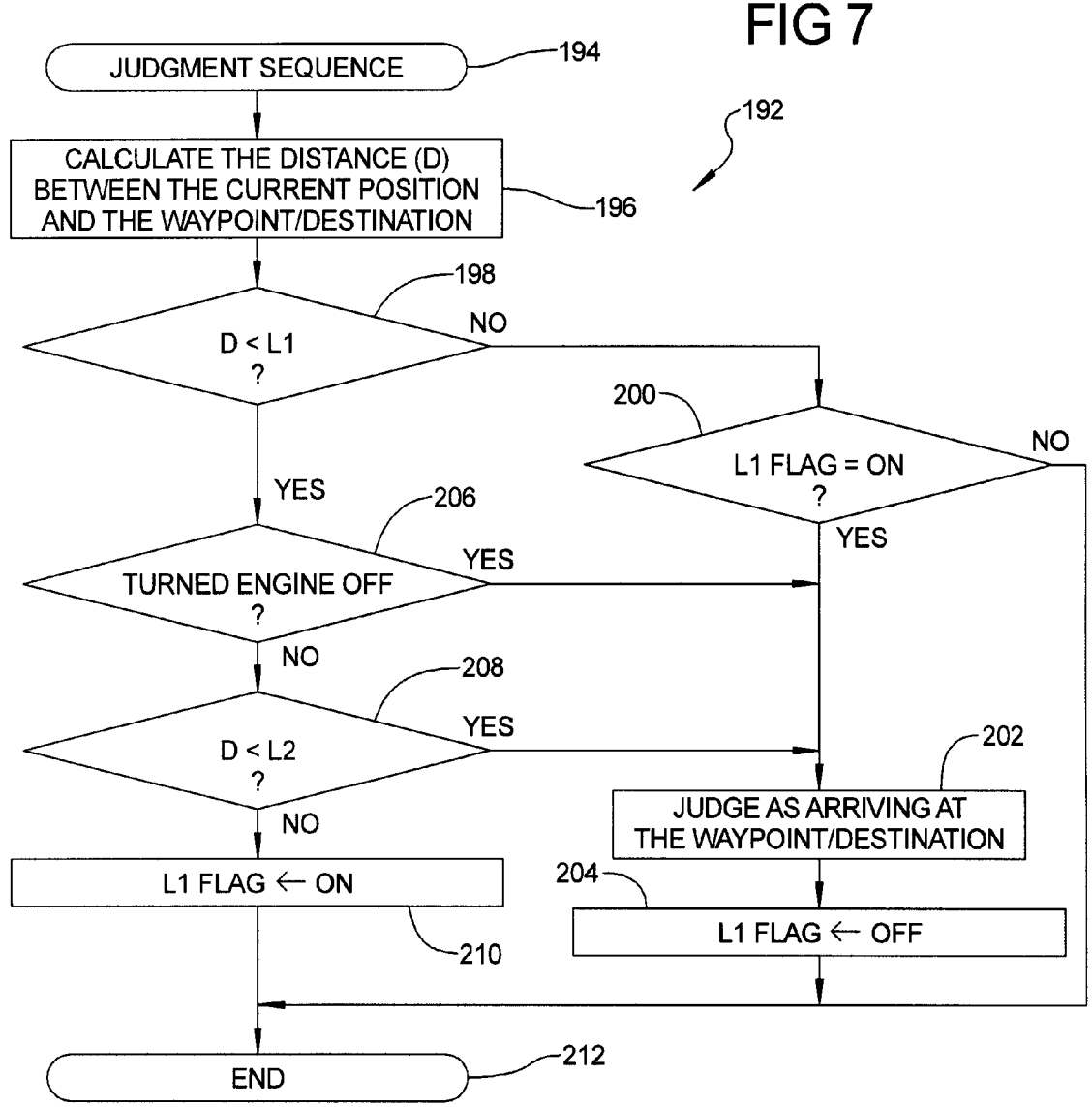
FIG. 7 is a flowchart depicting a method of operation of a navigation system in accordance with the teachings of the present invention.

With reference now including FIG. 6, flowchart of control logic 164 for storing navigation routes into a memory 39 of navigation control unit 38 will be presented. A route memory sequence begins at start block 166 and moves to decision block 168 where the logic inquires if the vehicle is in off-road mode. If the reply is "no," the logic ends at block 170 and may then again begin at start block 166. If the reply to the inquiry is "yes," then the logic proceeds to decision block 172 where the logic inquires if a driver has a route setting to input into the navigation system 34. If there is no route setting to be entered into the navigation system 34, then the logic ends at step 170. If there is a route setting, it may be input into the navigation system 34 using the buttons 42 of the navigation system or a touch screen feature of the navigation system display 40. Entering an off-road route into the navigation system was discussed above in conjunction with FIG. 3, such as a driver entering waypoints 46, 66 and entering a destination 68.

After a route setting is entered by a navigation system user, the control logic proceeds to step 174, where the navigation control unit 38 is set to begin displaying on the display 40 and storing into memory 39, a trajectory from start point 44 that the vehicle 10 actually traverses. Also at step 174, the straight-line trajectory between the vehicle start point and the first waypoint, the straight-line trajectories between the waypoints and the straight-line trajectory between the last waypoint and the entered destination are displayed on the display 40. A vehicle driver is able to make a visual comparison of his or her actual driving trajectory vis-à-vis the straight line trajectories between the vehicle start point, all waypoints, and the destination point. Continuing with FIG. 6, upon the navigation control unit 38 beginning the recording or saving of the actual vehicle trajectory into memory 39, the logic proceeds to inquiry block 176 where the logic enquires if the vehicle 10 has arrived at the destination entered by the user of the navigation system 34. If the reply is "no," then the logic proceeds to inquiry block 178 where the logic enquires if the vehicle has arrived at one of the waypoints entered by the navigation system user, such as waypoints 46, 66 of FIG. 3. If the reply is "no," the logic ends at step 170 and may begin again at step 166.

At inquiry block 178 of FIG. 6, if the reply is "yes," and the vehicle has arrived at a waypoint, such as waypoint 46, 66 or is proximate a waypoint, then the logic proceeds to block 180. As described in conjunction with FIG. 3, the navigation control unit 38 of the navigation system 34 causes breadcrumbs to appear on display 40 as vehicle 10 traverses an off-road terrain. When vehicle 10 is at a waypoint 46, 66, or proximate, such as within an area 26 around any designated waypoint, the navigation control unit 38 of the navigation system 34 may automatically shift or make appear, waypoint 46 to such breadcrumb at or proximate a waypoint, such as waypoint 46. After shifting or setting a waypoint at the location of a breadcrumb, which indicates the actual path of the off-road vehicle, the logic again repeats and moves to inquiry block 176. As long as the vehicle has not reached its destination and additional waypoints lie ahead in the vehicle trajectory, decision block 178 and block 180 will continue to be part of the logic, such as with the next waypoint 66.

When all waypoints have been exhausted or reached and the answer from inquiry block 176 is "yes," such as when the vehicle has reached destination 68, or is proximate to destination 68 such as when the vehicle is closest to destination 68 (see current position of vehicle 70 in FIG. 3), the logic proceeds to block 182.

A waypoint may be set to the location of a breadcrumb when a user turns off the vehicle engine or in the case of an electric vehicle, when the ignition is turned off or electricity to wheel-powering powering motors is turned off or disabled. Similarly, when all waypoints and corresponding routes have been set (e.g. displayed on screen 40 and saved to memory 39), including final destination 68, the entire resulting route 190 (FIG. 3) may be saved to memory 39 of the navigation control unit 38.

At inquiry block 184, the logic inquires whether the number of stored routes for a given destination is greater than a predetermined number, represented by "N." The navigation system user has the option of selecting the number of routes to a prescribed off-road destination. The advantage is that as soon as the navigation system control unit 38 compares the locations of a prescribed number of sequential breadcrumbs from the starting point, the navigation system user will have the option of replacing the real-time route being traveled by the vehicle employing the navigation system with a previously traveled route to the same destination, such previously traveled routes to such same destination are stored and recalled from memory 39. Thus, if the number of stored routes is not greater than "N," then the current route for which the same destination has just been reached will be stored in memory 39. However, if the number of stored routes is greater than "N," then the oldest route to such same destination as the real time destination will be deleted from memory in block 186 and the current real-time route will then be stored in memory at block 188. The logic may then end at block 170 and begin again at block 166.

Flowchart 192 pertains to a sequence of inquiries and actions for determining whether a vehicle is considered to have arrived at a selected waypoint(s) or the selected destination so that such waypoint(s) and destination may be moved or shifted to the respective breadcrumb of the real-time path of the vehicle. The logic routine of flowchart 192 is evaluated each time the logic of flowchart 164 reaches inquiry block 176 or inquiry block 178. Bubble 194 begins the flow logic. At step 196, the navigation control unit 38 calculates the distance "D" between the current vehicle position as it traverses the off-road terrain and the user-selected waypoints, such as user-selected waypoints 46, 66, and user-selected destination 68. At inquiry 198, the logic inquires whether the distance "D" is less than a distance "L1." L1 is a distance, such as a radial distance around a waypoint or destination location. Similarly, a distance L2 will be used in the logic of flowchart 192. At the start of the logic routine, a flag prescribed to L1 ("L1 Flag") is initially "OFF" and the distance assigned to L1 is greater than the distance assigned to L2. For instance, L1 may be 250 meters (approximately 820.2 feet) and L2 may be 50 meters (approximately 164.04 feet). With such prescribed distances, if the vehicle passes within 250 meters of a waypoint or destination, then the logic will proceed to inquiry block 206. However, if the vehicle does not pass within a radial distance of L1, that is, if D is not less than L1, then the control logic proceeds to inquiry block 200 which inquires whether the L1 flag is "ON." Because D is not less than L1, the L1 Flag is not "ON" and the logic proceeds to end bubble 212 and ends. However, if D is less than L1, the logic proceeds to inquiry block 206 where the logic inquires whether the engine is turned off. If the reply is "YES" then the logic proceeds to block 202 where the logic determines that the vehicle has arrived at a prescribed waypoint or destination along the off-road path. When the logic proceeds, at step 204, the L1 Flag is set to "OFF" and the logic ends at bubble 212. Alternatively, if at inquiry block 206 the engine is not turned off, the logic proceeds to step 208 where the inquiry is made if D is less than L2. If D is less than L2, then the logic proceeds to step 202 where the logic determines that the vehicle has arrived at a prescribed waypoint or destination along the off-road path. When the logic proceeds, at step 204, the L1 Flag is set to "OFF" and the logic ends at bubble 212. If at step 208 D is not less than L2, then the logic proceeds to step 210 where the L1 Flag is set to "ON" and the logic then ends at step 212. Of course, upon the logic ending at bubble 212, the routine of flowchart 192 may immediately begin again at bubble 194. Generally, the logic of routine is such that if the vehicle position is within the distance of L2 of a waypoint or destination, then the present location of the vehicle will be set as such waypoint or destination. However, there may be instances when positioning the vehicle within a distance of L2 of a waypoint or destination is not possible, such as due to impassable terrain. In such an instance the distance of L1, which is greater than L2, will be used as the distance to denote such waypoint or destination.

Figure 8:
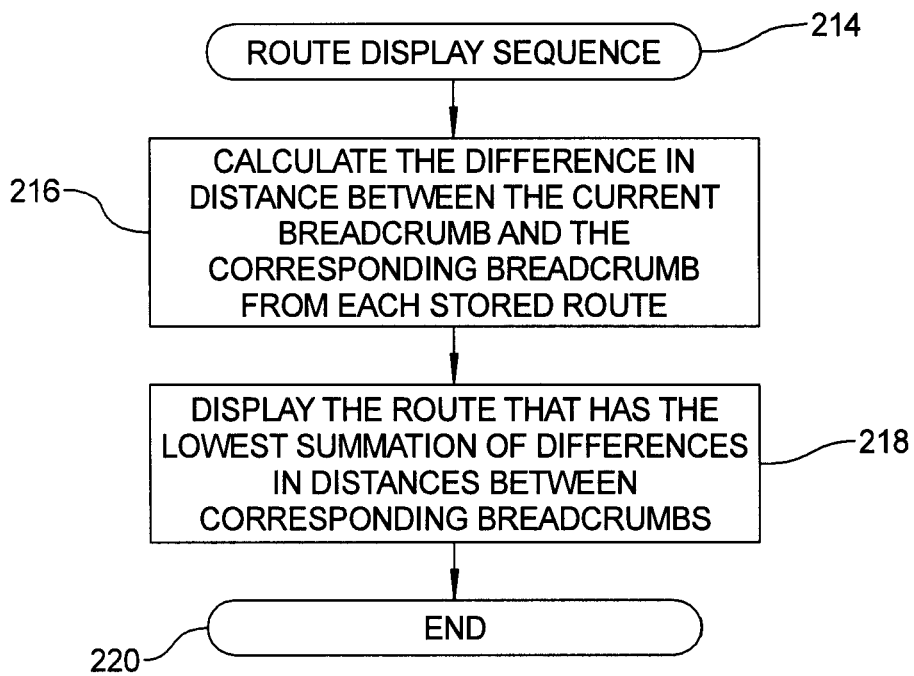
FIG. 8 is a flowchart depicting a method of operation of a navigation system in accordance with the teachings of the present invention.

Turning now to the control logic of FIG. 8, an explanation for automatically selecting a stored route upon comparison of all stored routes with the same destination to the real time route that is being traversed by the vehicle will be explained. A route display sequence begins at start bubble 214 and proceeds to block 216 where distances between each of the breadcrumbs in the real-time or current vehicle trajectory and each of a corresponding breadcrumb in the stored trajectories are compared. More specifically, and with reference to FIG. 5, trajectory 140 depicts a real-time or current vehicle trajectory while trajectory 138 depicts a previous vehicle trajectory that is stored in memory 39. For example purposes, breadcrumbs 144, 146, 148, 150 may be marked on the screen at a predetermined time interval or upon the vehicle traveling a predetermined distance from start point 143. The same may be true for trajectory 138 and breadcrumbs 154, 156, 158, 160 and start point 153. Stored trajectory 134 and stored trajectory 136 may then have corresponding breadcrumbs as depicted in FIG. 5 so that comparisons between breadcrumbs of the two trajectories can be made. FIG. 5 uses arrows to point out corresponding breadcrumbs in stored routes to real-time breadcrumb 152 (current trajectory).

Continuing, the control logic of block 216 of FIG. 8 will recognize that stored routes have the same destination as the current or real-time route, which ensures that a proper comparison will be made. In the example of FIG. 5, stored routes 134, 136, 138 have a destination of 142, which is the same as real-time trajectory 140. Then, the logic of block 216 will make travel distance comparisons between the real-time trajectory 140 breadcrumbs and corresponding stored breadcrumbs. As an example, if trajectory breadcrumbs 144, 146, 148, 150, 152 were overlaid with trajectory breadcrumbs 154, 156, 158, 160, 162, from start point to destination for example, the latter set would align with the prior set with the exception of a distance or gap between breadcrumb 162 of trajectory 138 and breadcrumb 152 of trajectory 140. If the same type of comparison was made between trajectory 140 and trajectory 134, given that the scales of each of the trajectories 134, 136, 138, 140 is the same, one can quickly see that if the breadcrumbs 137, 139, 141, 145 and 147 are overlaid with the breadcrumbs 144, 146, 148, 150, and 152 that the sum of the difference in distances between breadcrumbs 148 and 141, breadcrumbs 150 and 145, and breadcrumbs 152 and 147 would be greater than that of 152 and 162. Thus, in block 218, because the sum of the differences in distances between corresponding breadcrumbs is less between trajectory 140 and 138 than for trajectory 140 and 134, for example, stored trajectory 138 will be recommended on display 40 to the vehicle driver because the trajectory 138 is a known trajectory to destination 142 that is similar in trajectory to the current, real-time trajectory. This gives the driver an advantage of selecting a known route to a destination. The routine then ends in bubble 220.

Stated in slightly different terms, a method of operating a navigation system, such as with or through a navigation control unit 38, in a vehicle 10 may entail invoking an off-road mode of the navigation system 34, such as with a physical button 42 or as part of the touch screen display 40; displaying a first off-road terrain on the display 40 of the navigation system in a first instance; displaying a first present location (such as in real-time) of the vehicle on the display 40; inputting a first user-input off-road destination 68 into the navigation system 34; inputting a first user-input off-road waypoint into the navigation system, such as by touching the surface of the display 40 when the off-road terrain appears on the display 40; displaying straight line trajectories (e.g. trajectories 48, 88) between the start point, the first user-input off-road waypoint (e.g. waypoint 46) and the destination on a display 40 of the navigation system 34 (more than one waypoint are possible but not required); and displaying a first real-time path of on-screen breadcrumbs (e.g. breadcrumbs 50, 52, 54, 56, 56, 58, 60, 62, 64, 72, 74, 76, 78, 80, 82, 84, 86) as the vehicle travels off-road.

The method may also entail shifting on the display 40, each user-entered off-road waypoint 46, 66 to a closest on-screen breadcrumb (e.g. breadcrumbs 64, 80) of the first real-time path 190. Like the waypoints 46, 66, the user-entered destination 68 may also undergo shifting on the display 40 to the closest on-screen breadcrumb 70, if the user entered destination is not traversable by the vehicle or the vehicle 10 enters within a pre-defined perimeter of the destination 68. Similarly, the shifting of the user-entered destination 68 may also undergo shifting on the display 40 to the closest on-screen breadcrumb 70, if the vehicle engine is shut off, meaning that the destination has been reached). The first real-time path, and additional traveled paths created from real-time paths, may be stored in a memory, which may be resident within the navigation control unit 38. Continuing, the method may comprise displaying the first off-road terrain on the display 40 of the navigation system 34 in a second instance; displaying a second present location of the vehicle on the display 40; inputting the first user-input off-road destination into the navigation system 34 in a second instance; inputting a second user-input off-road waypoint into the navigation system 34, such as via a touch screen display 40; displaying straight line trajectories between the second present location of the vehicle, the second user-input off-road waypoint and the first destination on the display of the navigation system; displaying a second real-time path of on-screen breadcrumbs as the vehicle travels off-road; shifting, on the display, the second user-input off-road waypoint to the closest on-screen breadcrumb of the second real-time path; shifting, on the display, the first user-input off-road destination in a second instance, to the closest on-screen breadcrumb of the second real-time path of on-screen breadcrumbs; the first user-input off-road destination into the navigation system in a second instance; and storing the second real-time path in a navigation system memory for later display. Selecting a maximum quantity of real-time paths to store in memory. The method may also entail setting a predetermined number of stored off-road paths and then deleting the oldest path when a path that is attempted to be stored will cause such predetermined number to be exceeded.

Another variation of the method of operating a navigation system in a vehicle may entail invoking an off-road mode of the navigation system 34; displaying a first off-road terrain on a display 40 of the navigation system 34 in a first instance; displaying a first present location of the vehicle on the display 40; inputting a first user-input off-road destination into the navigation system 34, such as with buttons 42 or a touch screen option of the display 40; inputting a first user-input off-road waypoint into the navigation system; displaying straight line trajectories between the start point, the first user-input off-road waypoint and the destination on a display of the navigation system; displaying a first real-time path of on-screen breadcrumbs as the vehicle travels off-road proximate or near the straight line trajectories; calculating a first distance between the current vehicle position and the waypoint; comparing the first distance between the current vehicle position and the waypoint to a first predetermined distance; shifting, on the display, the first user-input off-road waypoint to an on-screen breadcrumb of the first real-time path when the on-screen breadcrumb of the first real-time path is within a predetermined distance of the first user-input off-road waypoint; and displaying a new waypoint on the screen on the first real-time path when a vehicle engine is shut off. The breadcrumb paths depicted in FIGS. 3, 4 and path 140 in FIG. 5, may be considered real-time breadcrumb paths. Moreover, the method may entail shifting, on the display 40, the first user-input off-road destination 68 to the closest on-screen breadcrumb of the first real-time path of on-screen breadcrumbs. The first real-time path may be stored in a memory of the navigation system 34.

The method may further entail displaying the first off-road terrain on the display of the navigation system in a second instance (i.e. for a second time); displaying a second present location of the vehicle on the display; inputting the first user-input off-road destination into the navigation system in a second instance; inputting a second user-input off-road waypoint into the navigation system; displaying straight line trajectories between the second present location of the vehicle, the second user-input off-road waypoint and the first destination on the display of the navigation system; displaying a second real-time path of on-screen breadcrumbs as the vehicle travels off-road; shifting on the display, the second user-input off-road waypoint to the closest on-screen breadcrumb of the second real-time path; shifting on the display, the first user-input off-road destination in a second instance, to the closest on-screen breadcrumb of the second real-time path of on-screen breadcrumbs; the first user-input off-road destination into the navigation system in a second instance; and storing the second real-time path in a memory. The navigation system user may select a maximum quantity of real-time paths to store in memory to become stored paths or routes, to conserve memory or maintain a simplicity about the system when faced with selecting a route from the navigation system display, as explained in conjunction with FIG. 5. The maximum quantity of stored paths will not be exceeded since the oldest, or first stored path (breadcrumb path) of the stored paths will be deleted from memory when yet another path or route is attempted to be stored.

Still yet, another method of operating a navigation system in a vehicle may entail invoking an off-road mode of the navigation system; displaying a first off-road terrain on a display of the navigation system in a first instance; displaying a first present location of the vehicle on the display; inputting a first user-input off-road destination into the navigation system; displaying a first real-time path of on-screen breadcrumbs as the vehicle travels off-road toward the first user-input off-road destination; comparing the first real-time path of on-screen breadcrumbs to a first stored off-road path of breadcrumbs having a same first user-input off-road destination; and comparing the first real-time path of on-screen breadcrumbs to a second stored off-road path of breadcrumbs having the same first user-input off-road destination. Comparing the first real-time path of on-screen breadcrumbs to a first stored off-road path of breadcrumbs having the same first user-input off-road destination may further entail calculating a first distance between a first breadcrumb of the first real-time path of on-screen breadcrumbs and a first breadcrumb of the first stored off-road path of breadcrumbs; calculating a second distance between a first breadcrumb of the first real-time path of on-screen breadcrumbs and a first breadcrumb of the second stored off-road path of breadcrumbs; determining whether the first distance or the second distance is a lower distance; displaying an entire stored off-road path to which the lower distance pertains.

Additionally, the method may entail calculating a third distance between a second breadcrumb of the first real-time path of on-screen breadcrumbs and a second breadcrumb of the first stored off-road path of breadcrumbs; calculating a fourth distance between a second breadcrumb of the first real-time path of on-screen breadcrumbs and a second breadcrumb of the second stored off-road path of breadcrumbs; adding together the first distance and the third distance to arrive at a first stored off-road path summation; adding together the second distance and the fourth distance to arrive at a second stored off-road path summation; determining whether the first stored off-road path summation or the second stored off-road path summation is a lower summation (i.e. a lower value); and displaying an entire, previously stored off-road path that pertains to the lower summation. An advantage of using a summation of distances between a current, real-time breadcrumb and a stored breadcrumb, when the destination is the same, is that a route that is known to be passable or travelable by the off-road vehicle being driven may be quickly selected. In arriving at the real-time distances to sum, the breadcrumbs of the real-time path may be deposited at the same prescribed time interval or at the same prescribed distance interval from the start points, such as start points 135, 153, 143 of FIG. 5.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method of operating a navigation system in a vehicle comprising:
    invoking an off-road mode of the navigation system;
    displaying a first off-road terrain on a display of the navigation system in a first instance;
    displaying a first present location of the vehicle on the display;
    inputting a first user-input off-road destination into the navigation system;
    inputting at least one first user-input off-road waypoint into the navigation system;
    displaying straight line trajectories between a start point and the first of said at least one first user-input off-road waypoint, between any consecutive waypoints of said at least one first user-input off-road waypoint and between the last of said at least one first user-input off-road waypoint and the destination on a display of the navigation system;
    displaying a first real-time path of on-screen breadcrumbs as the vehicle travels off-road;
    determining if the vehicle is within a first distance from one of said at least one first user-input off-road waypoint;
    determining if an engine of the vehicle is turned off;
    determining if the vehicle is within a second distance, smaller than the first distance, from the one of said at least one first user-input off-road waypoint if it is determined that the vehicle is within the first distance from the one of said at least one first user-input off-road waypoint and the engine is not turned off; and
    relocating, on the display, a position of said one of said at least one user-entered off-road waypoint from a currently displayed position to a position on the display of a closest on-screen breadcrumb of the first real-time path when the vehicle is within the first distance from said at least one first user-input off-road waypoint and the engine is turned off or when the vehicle is within the second distance from said at least one first user-input off-road waypoint.

2. The method of claim 1, further comprising:
    relocating on the display, the user-entered destination to the closest on-screen breadcrumb.

3. The method of claim 2, further comprising:
    storing the first real-time path in a memory.

4. The method of claim 3, further comprising:
    displaying the first off-road terrain on the display of the navigation system in a second instance;
    displaying a second present location of the vehicle on the display;
    inputting the first user-input off-road destination into the navigation system in a second instance;
    inputting at least one second user-input off-road waypoint into the navigation system;
    displaying straight line trajectories between a second present location of the vehicle and the first of said at least one second user-input off-road waypoint, between any consecutive waypoints of said at least one second user-input off-road waypoint, and between the last of said at least one second user-input off-road waypoint and the first destination on the display of the navigation system;
    displaying a second real-time path of on-screen breadcrumbs as the vehicle travels off-road;
    relocating, on the display, each of said at least one second user-input off-road waypoint to the closest on-screen breadcrumb of the second real-time path;
    relocating, on the display, the first user-input off-road destination in a second instance, to the closest on-screen breadcrumb of the second real-time path of on-screen breadcrumbs;
    inputting the first user-input off-road destination into the navigation system in a second instance; and storing the second real-time path in the memory.

5. The method of claim 4, further comprising:
    selecting a maximum quantity of real-time paths to store in the memory.

6. The method of claim 5, further comprising:
deleting the oldest real-time path of on-screen breadcrumbs from the memory.

7. A method of operating a navigation system in a vehicle comprising:
invoking an off-road mode of the navigation system;
displaying a first off-road terrain on a display of the navigation system in a first instance;
displaying a first present location of the vehicle on the display;
inputting a first user-input off-road destination into the navigation system;
inputting at least one first user-input off-road waypoint into the navigation system;
displaying straight line trajectories between a start point and the first of said at least one user-input off-road waypoint, between any consecutive waypoints of said at least one first user-input off-road waypoint and between the last of said at least one first user-input off-road waypoint and the destination on a display of the navigation system;
displaying a first real-time path of on-screen breadcrumbs as the vehicle travels off-road proximate the straight line trajectories;
calculating a first distance between the current vehicle position and one of said at least one first user-input off-road waypoint;
comparing the first distance between the current vehicle position and the one of said at least one first user-input off-road waypoint to a first predetermined distance;
determining if an engine of the vehicle is turned off;
calculating a second distance between the current vehicle position and the one of said at least one first user-input off-road waypoint if the first distance is less than the first determined distance and the engine is not turned off;
comparing the second distance between the current vehicle position and the one of said at least one first user-input off-road waypoint to a second predetermined distance smaller than the first predetermined distance if it is determined that the first distance is less than the first determined distance and the engine is not turned off;
relocating, on the display, a position of the one of said at least one first user-input off-road waypoint from a currently displayed position to a position of a displayed on-screen breadcrumb of the first real-time path when the on-screen breadcrumb of the first real-time path is within the second predetermined distance of the one of said at least one first user-input off-road waypoint; and
displaying a new waypoint on the screen on the first real-time path when said vehicle engine is shut off.

8. The method of claim 7, further comprising:
relocating on the display, the first user-input off-road destination to the closest on-screen breadcrumb of the first real-time path of on-screen breadcrumbs.

9. The method of claim 8, further comprising:
storing the first real-time path in a memory of the navigation system.

10. The method of claim 9, further comprising:
displaying the first off-road terrain on the display of the navigation system in a second instance;
displaying a second present location of the vehicle on the display;
inputting the first user-input off-road destination into the navigation system in the second instance;
inputting at least one second user-input off-road waypoint into the navigation system;
displaying straight line trajectories between a second present location of the vehicle and the first of said at least one second user-input off-road waypoint, between any consecutive waypoints of said at least one second user-input off-road waypoint, and between the last of said at least one second user-input off-road waypoint and the first destination on the display of the navigation system;
displaying a second real-time path of on-screen breadcrumbs as the vehicle travels off-road;
relocating, on the display, each of said at least one second user-input off-road waypoint to the closest on-screen breadcrumb of the second real-time path;
relocating, on the display, the first user-input off-road destination in a second instance, to the closest on-screen breadcrumb of the second real-time path of on-screen breadcrumbs;
inputting the first user-input off-road destination into the navigation system in the second instance; and
storing the second real-time path in the memory.

11. The method of claim 10, further comprising:
selecting a maximum quantity of real-time paths to store in the memory.

12. The method of claim 11, further comprising:
deleting the oldest real-time path of on-screen breadcrumbs from the memory.

13. A method of operating a navigation system in a vehicle comprising:
invoking an off-road mode of the navigation system;
displaying a first off-road terrain on a display of the navigation system in a first instance;
displaying a first present location of the vehicle on the display;
inputting a first user-input off-road destination into the navigation system;
displaying a first real-time path of on-screen breadcrumbs as the vehicle travels off-road toward the first user-input off-road destination;
comparing the first real-time path of the on-screen breadcrumbs to a first stored off-road path of breadcrumbs having a same first user-input off-road destination;
comparing the first real-time path of on-screen breadcrumbs to a second stored off-road path of breadcrumbs different than the first real-time path but having the same first user-input off-road destination;
determining that the vehicle is traveling the first stored off-road path when the first real-time path corresponds to the first stored off-road path; and
determining that the vehicle is traveling the second stored off-road path when the first real-time path corresponds to the second stored off-road path; wherein
comparing the first real-time path of on-screen breadcrumbs to a first stored off-road path of breadcrumbs having the same first user-input off-road destination further comprises:
calculating a first distance between a first breadcrumb of the first real-time path of on-screen breadcrumbs and a first breadcrumb of the first stored off-road path of breadcrumbs;
calculating a second distance between a first breadcrumb of the first real-time path of on-screen breadcrumbs and a first breadcrumb of the second stored off-road path of breadcrumbs;
determining whether the first distance or the second distance is a lower distance; and
displaying an entire stored off-road path to which the lower distance pertains.

14. The method of claim 13, further comprising:
calculating a third distance between a second breadcrumb of the first real-time path of on-screen breadcrumbs and a second breadcrumb of the first stored off-road path of breadcrumbs;
calculating a fourth distance between a second breadcrumb of the first real-time path of on-screen breadcrumbs and a second breadcrumb of the second stored off-road path of breadcrumbs;
adding together the first distance and the third distance to arrive at a first stored off-road path summation;
adding together the second distance and the fourth distance to arrive at a second stored off-road path summation;
determining whether the first stored off-road path summation; or the second stored off-road path summation is a lower summation; and
displaying an entire stored off-road path to which the lower summation pertains.

* * * * *